US007773526B2

United States Patent
Abe

(10) Patent No.: US 7,773,526 B2
(45) Date of Patent: Aug. 10, 2010

(54) NETWORK INTERFACE CONTROL PROGRAM AND NETWORK INTERFACE CONTROLLER

(75) Inventor: Tomoaki Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 12/039,492

(22) Filed: Feb. 28, 2008

(65) Prior Publication Data

US 2008/0159130 A1 Jul. 3, 2008

Related U.S. Application Data

(63) Continuation of application No. PCT/JP2005/016147, filed on Sep. 2, 2005.

(51) Int. Cl.
*H04L 12/26* (2006.01)
(52) U.S. Cl. ...................................... 370/239
(58) Field of Classification Search ................. 370/230, 370/230.1, 231
See application file for complete search history.

(56) References Cited

U.S. PATENT DOCUMENTS

2002/0105949 A1 8/2002 Shinomiya

2007/0201380 A1* 8/2007 Ma et al. ..................... 370/254
2008/0304519 A1* 12/2008 Koenen et al. ............... 370/477

FOREIGN PATENT DOCUMENTS

| JP | A 11-163867 | 6/1999 |
| JP | 11-328067 | 11/1999 |
| JP | 2002-232427 | 8/2002 |

OTHER PUBLICATIONS

IEEE P802.3ad Link Aggregation Task Force [Searched on Aug. 23, 2005], Internet <URL:http://grouper.ieee.org/groups/802/3/ad/index.html>, pp. 1-92.

* cited by examiner

*Primary Examiner*—Melvin Marcelo
(74) *Attorney, Agent, or Firm*—Greer, Burns & Crain, Ltd.

(57) ABSTRACT

A network interface control program for causing a computer including a plurality of network interfaces connected to a network repeater, includes detecting a traffic increase in each network interface; expanding a communication band by grouping a network interface in which the traffic increase is detected and another unused network interface; detecting an inactive network interface; and activating the network interface detected. The band expanding includes grouping the network interface activated in the activating.

8 Claims, 9 Drawing Sheets

FIG.3

| GROUP IDENTIFIER | IF IDENTIFIER |
|---|---|
| Group1 | IF1 |
| UNUSED | IF2 |

FIG.4

| IF IDENTIFIER | IF1 | IF2 | |
|---|---|---|---|
| GROUP IDENTIFIER | Group1 | UNUSED | |
| TRANSMISSION-BUFFER WAITING FREQUENCY | 0 | 0 | TRAFFIC STATISTICAL INFORMATION |
| RECEPTION-BUFFER DEPLETION FREQUENCY | 0 | 0 | |

FIG.8A

| GROUP IDENTIFIER | IF IDENTIFIER | PRIORITY |
|---|---|---|
| Group1 | IF1 (10) | 1 |
| Group2 | IF3 (30) | 2 |
| UNUSED | IF2 (20) | |

OPERATION A... (Group1 row)
OPERATION B... (Group2 row)

FIG.8B

| GROUP IDENTIFIER | IF IDENTIFIER | PRIORITY |
|---|---|---|
| Group1 | IF1 (10), IF2 (20) | 1 |
| Group2 | IF3 (30) | 2 |
| UNUSED | | |

FIG.8C

| GROUP IDENTIFIER | IF IDENTIFIER | PRIORITY |
|---|---|---|
| Group1 | IF1 (10) | 1 |
| Group2 | IF2 (20), IF3 (30) | 2 |
| UNUSED | | |

NETWORK INTERFACE CONTROL PROGRAM AND NETWORK INTERFACE CONTROLLER

BACKGROUND OF THE INVENTION

This application is a continuation of International Application No. PCT/JP2005/016147, filed Sep. 2, 2005.

1. Field of the Invention

The present invention relates to a network interface control program and a network interface controller for controlling a plurality of network interfaces connected to a network repeater, and, more particularly to a network interface control program and a network interface controller for automatically executing band expansion/reduction according to communication situation to provide an appropriate communication band.

2. Description of the Related Art

Conventionally, band expansion/reduction processing in communication via the network interface (network IF) has been performed manually. For example, in a server, when a communication failure such as delay in a communication response time occurs due to an increase of communication traffic, as a method for handling the problem, a cause thereof is specified by human determination based on statistics of CPU load and data transmission amount, and an operation for adding the network IF is performed manually to expand the band in communications. With this method, however, manual traffic management and an expansion operation are required, thereby causing a large cost increase.

For the expansion of the communication band, human labor can be reduced by securing beforehand a broadband transmission line capable of preventing a communication failure due to an increase of the traffic beforehand. Particularly, when a cost aspect is taken into consideration, a method of forming a plurality of transmission lines between the network IF and a LAN switch is effective as a method of band expansion. As one example thereof, there is link aggregation prescribed in IEEE 802.3ad (for example, see IEEE P802.3ad Link Aggregation Task Force [Searched on Aug. 23, 2005], Internet <URL:http://grouper.ieee.org/groups/802/3/ad/index.html>). In the link aggregation, a plurality of transmission lines is virtually regarded as one transmission line, so that the communication band can be expanded and redundancy can be provided to the transmission line.

In the link aggregation prescribed in IEEE 802.3ad, there is provided a function for recovering a communication state, when a communication failure occurs in a part of a plurality of grouped communication lines, and the LAN switch detects the failure, by excluding the transmission line having the detected failure from a grouping target. However, this function only corresponds to a communication failure detectable by the LAN switch, such as physical disconnection, and flexible band change cannot be executed corresponding to a temporary communication failure such as a traffic increase.

In view of the above problems, it is an object of the present invention to provide a network interface program and a network interface controller for automatically executing band expansion/reduction according to band usage, to provide an appropriate communication band.

SUMMARY OF THE INVENTION

It is an object of the present invention to at least partially solve the problems in the conventional technology.

According to an aspect of the present invention, a network interface control method is performed on a computer including a plurality of network interfaces connected to a network repeater, and includes detecting a traffic increase in each network interface; expanding a communication band by grouping a network interface in which the traffic increase is detected and another unused network interface; detecting an inactive network interface; and activating the network interface detected. The band expanding includes grouping the network interface activated in the activating.

According to another aspect of the present invention, a network interface controller includes a plurality of network interfaces connected to a network repeater; a traffic-increase detection unit that detects a traffic increase in each network interface; a band expansion unit that expands a communication band by grouping a network interface in which the traffic increase is detected by the traffic-increase detection unit and another unused network interface; an inactive-interface detection unit that detects an inactive network interface; and a hardware activation unit that activates the network interface detected by the inactive-interface detection unit. The band expansion unit groups the network interface activated by the hardware activation unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is one example of a grouping IF list;

FIG. 4 is one example of the grouping IF list;

FIG. 8A is one example of a grouping IF list according to the second embodiment;

FIG. 8B depicts the grouping IF list at the time of finishing a process in FIG. 7B;

FIG. 8C depicts the grouping IF list at the time of finishing a process in FIG. 7D.

DETAILED DESCRIPTION OF THE PREFERRED EMBODIMENTS

Exemplary embodiments of a network interface control program and a network interface controller according to the present invention will be explained below in detail with reference to the accompanying drawings. Note that the present invention is not limited to the embodiments.

Figure 1:
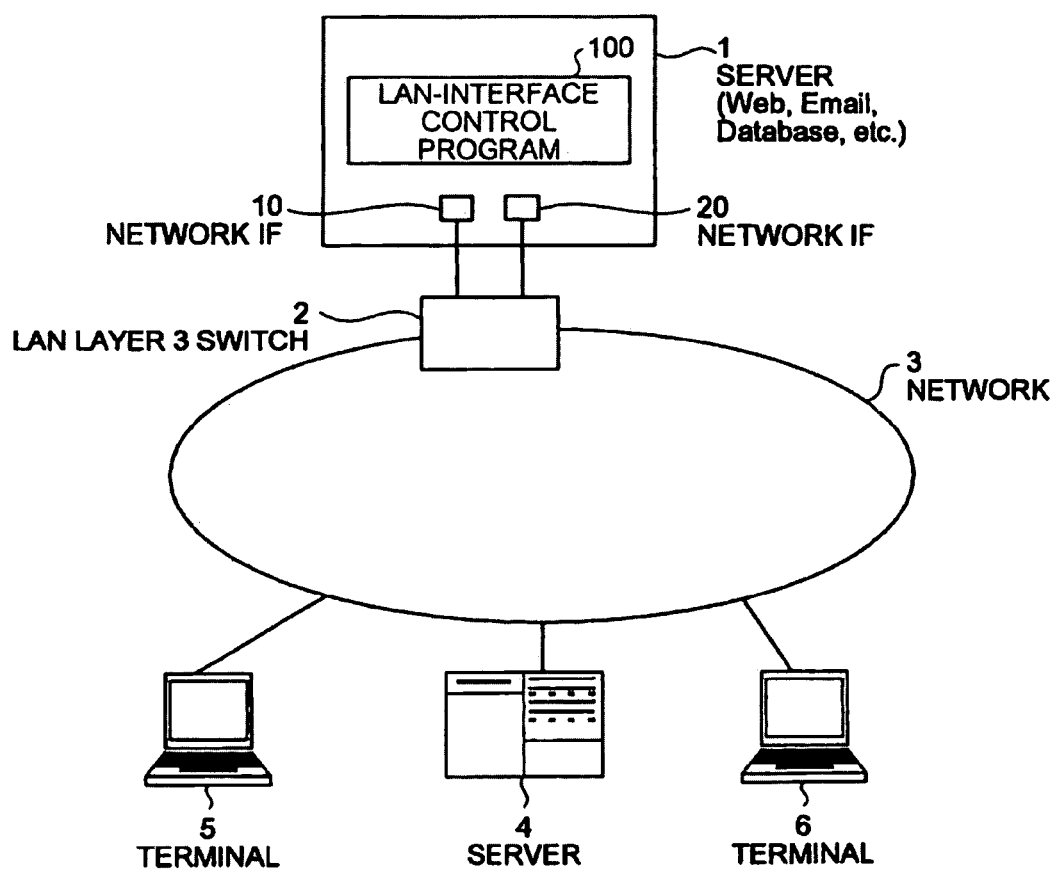
FIG. 1 is an explanatory diagram for explaining a network configuration to which a LAN-interface control program according to a first embodiment is applied.

A network configuration to which an LAN-interface control program according to a first embodiment is applied is explained. FIG. 1 is an explanatory diagram for explaining the network configuration, to which the LAN-interface control program according to the first embodiment is applied. A server 1 shown in FIG. 1 is a computer used as a Web server, a mail server, a database server, or the like. The server 1 is connected to a network 3 via a LAN layer 3 switch (L3 switch) 2, for transmitting and receiving data to/from another server 4, and terminals 5 and 6 connected to the network 3.

The server 1 includes two network IFs 10 and 20. The network IFs 10 and 20 are respectively connected to the LAN L3 switch 2 by a separate transmission line, and also connected to the network 3 via the LAN L3 switch 2.

A LAN-interface control program 100 according to the first embodiment is executed on the server 1, and functions as a device driver that controls the network IFs 10 and 20 in a data link layer in an OSI reference model. The LAN-interface control program 100 detects transmission line traffic in the two network IFs 10 and 20, and controls grouping of the network IFs 10 and 20 according to the traffic and release of grouping, thereby controlling expansion/reduction of the band.

The grouping here represents a process by the link aggregation, and the two transmission lines separately formed for the two network IFs 10 and 20 are virtually regarded as one transmission line to share the two network IFs 10 and 20, thereby enabling to expand the band and ensure the redundancy.

The LAN L3 switch 2 functions as a router and connects the server 1 and the network 3 with each other. The LAN L3 switch 2 allows link aggregation, and when the network IFs 10 and 20 are grouped by the LAN-interface control program 100, the LAN L3 switch 2 can virtually regard the two network IFs 10 and 20 as one interface.

Figure 2:
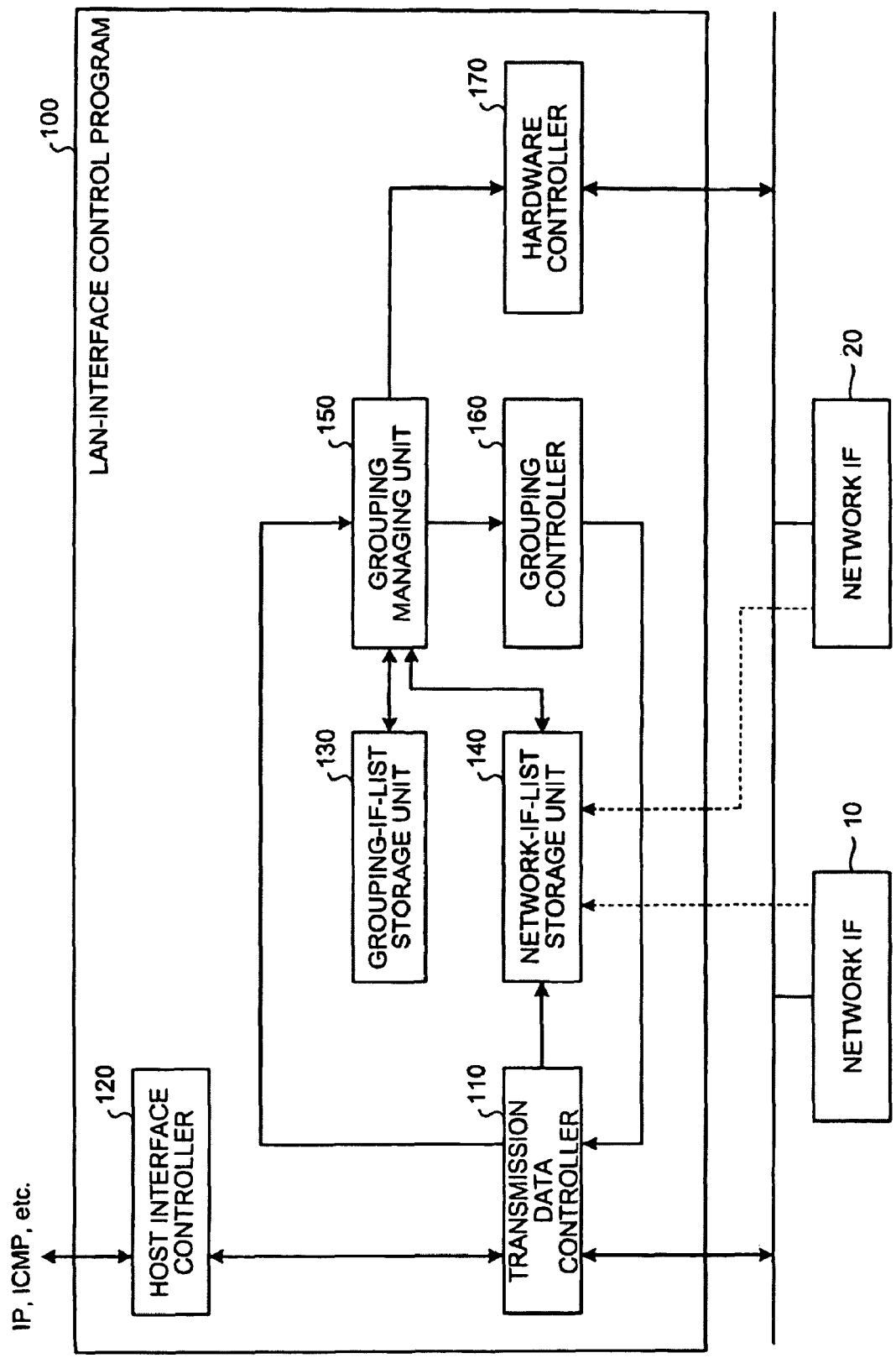
FIG. 2 is a functional block diagram of a configuration of the LAN-interface control program according to the first embodiment.

The configuration of the LAN-interface control program 100 according to the first embodiment is explained next. FIG. 2 is a functional block diagram of the configuration of the LAN-interface control program 100 according to the first embodiment. As shown in FIG. 2, the LAN-interface control program 100 includes a transmission data controller 110, a host interface controller 120, a grouping-IF-list storage unit 130, a network-IF-list storage unit 140, a grouping managing unit 150, a grouping controller 160, and a hardware controller 170.

The transmission data controller 110 is a processing unit that controls transmission of data between the network IFs 10 and 20 and the host interface controller 120. That is, the transmission data controller 110 processes the data received from the network IFs 10 and 20, and transmits the data to the host interface controller 120. Further, the transmission data controller 110 processes the data received from the host interface controller 120, and transmits the data to the network IFs 10 and 20.

The transmission data controller 110 detects a traffic decrease in the network IF to notify the grouping managing unit 150 of the decrease. Specifically, when the number of transmission packets to and from the network IF is 0 for a predetermined period of time, the transmission data controller 110 determines that the traffic in the network IF has decreased. A determination method of the traffic decrease is not limited to the method, and for example, when the number of transmission packets is less than a predetermined threshold, it can be determined that the traffic has decreased.

The host interface controller 120 is a processing unit that operates as an interface of a host protocol such as IP (Internet Protocol) and ICMP (Internet Control Message Protocol), and an OS (Operating System).

The grouping-IF-list storage unit 130 stores a grouping IF list, which is used at the time of grouping the respective network IFs 10 and 20. FIG. 3 is one example of the grouping IF list. In the grouping IF list, as shown in FIG. 3, a group identifier and an IF identifier of the network IF constituting the group are associated with each other.

The group identifier indicates a group to which the network IF belongs. However, a group having "unused" as the group identifier is allocated to a deactivated network IF. In FIG. 3, the network IF having "IF1" as the IF identifier belongs to a group "Group1", and the network IF having "IF2" as the IF identifier is an "unused" group, that is, inactive.

The network-IF-list storage unit 140 stores a network IF list indicating conditions of the respective network IFs 10 and 20. FIG. 4 is one example of the network IF list. As shown in FIG. 4, in the network IF list, the IF identifier, the group identifier, a transmission-buffer waiting frequency, and a reception-buffer depletion frequency are associated with each other for each network IF.

The transmission-buffer waiting frequency indicates a frequency of transmit-wait occurred in a given length of time in the transmission data controller 110. The transmit-wait occurs when there is no space in a transmission buffer of the network IFs 10 and 20 with an increase of traffic, at the time of transmitting the data from the transmission data controller 110 to the network IFs 10 and 20. The transmission data controller 110 counts the frequency of transmit-wait, and stores the frequency of transmit-wait in the network-IF-list storage unit 140 with a lapse of a certain time.

The reception-buffer depletion frequency indicates a frequency of pause frames transmitted in a given length of time in the network IFs 10 and 20. The pause frame is transmitted when there is no space in a reception buffer of the network IFs 10 and 20 with an increase of traffic, at the time of receiving the data transmitted from the LAN L3 switch 2 by the network IFs 10 and 20. The network IFs 10 and 20 count the transmission frequency of the pause frame, and stores the transmission frequency of the pause frame in the network-IF-list storage unit 140 with a lapse of a certain time. The transmission-buffer waiting frequency and the reception-buffer depletion frequency are used as traffic statistical information at the time of detecting the traffic increase.

The grouping managing unit 150 is a processing unit that manages information relating to the grouping of the network IF. The grouping managing unit 150 monitors values of the transmission-buffer waiting frequency and the reception-buffer depletion frequency stored in the network-IF-list storage unit 140, and determines that the traffic has increased when at least one of these values becomes equal to or larger than a predetermined threshold.

When having determined that the traffic has increased, the grouping managing unit 150 instructs the hardware controller 170 to activate an inactive network IF, and instructs the grouping controller 160 to group the network IFs, thereby expanding the band. The grouping managing unit 150 updates the grouping IF list stored in the grouping-IF-list storage unit 130 and the network IF list stored in the network-IF-list storage unit 140 based on the instruction.

When detection of the traffic decrease in the network IF is notified by the transmission data controller 110, the grouping managing unit 150 instructs the grouping controller 160 to release the grouping of the network IF, and instructs the hardware controller 170 to deactivate the network IF. The grouping managing unit 150 updates the grouping IF list stored in the grouping-IF-list storage unit 130 and the network IF list stored in the network-IF-list storage unit 140.

The grouping controller 160 is a processing unit that sets the link aggregation. Upon reception of a grouping instruction from the grouping managing unit 150, the grouping controller 160 groups the relevant network IF. Upon reception of a grouping release instruction from the grouping managing unit 150, the grouping controller 160 releases the grouping of the relevant network IF. After executing grouping or release of the grouping, the grouping controller 160 outputs a change result of a data transmission route to the transmission data controller 110.

The hardware controller 170 is a processing unit that performs various settings relating to the operation of the network IFs 10 and 20 and controls activation/deactivation of the network IFs 10 and 20. Upon reception of an activation instruction from the grouping managing unit 150, the hardware controller 170 activates the relevant network IF. Upon reception of a deactivation instruction from the grouping managing unit 150, the hardware controller 160 deactivates the relevant network IF.

Thus, the transmission data controller 110 or the grouping managing unit 150 in the LAN-interface control program 100 detects an increase or decrease of the traffic in the respective network IFs 10 and 20, and the grouping managing unit 150 executes grouping control with respect to the network IFs 10 and 20 based on the detection result, thereby enabling grouping control of the network IFs 10 and 20 corresponding to the increase or decrease of the traffic.

Figure 5:
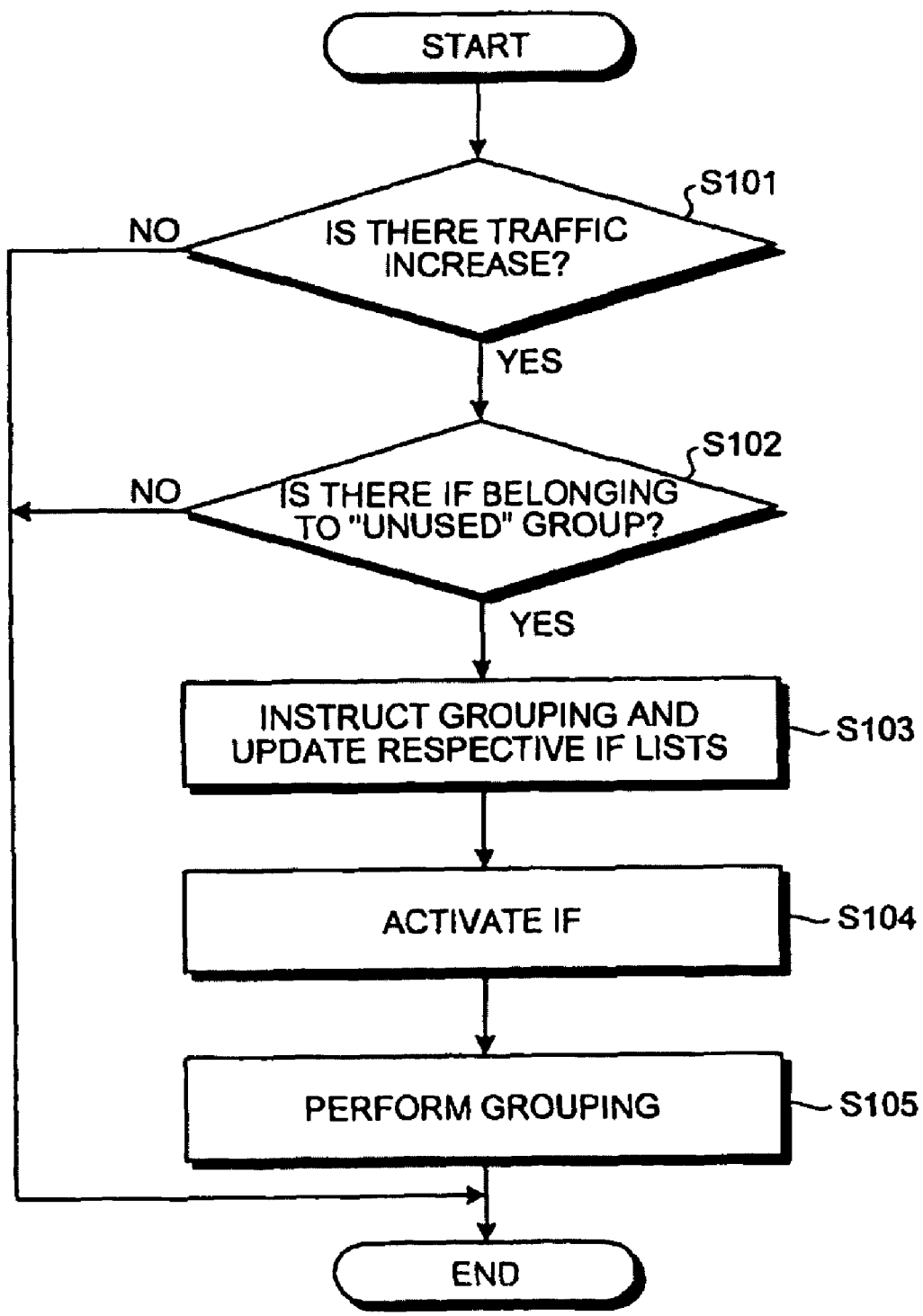
FIG. 5 is a flowchart of a process procedure of an automatic band-expansion-control process according to the first embodiment.

A process procedure of automatic band-expansion-control process according to the first embodiment is explained next. FIG. 5 is a flowchart of the process procedure of the automatic band-expansion-control process according to the first embodiment. The automatic band-expansion-control process is performed regularly with a lapse of a certain time. Before the automatic band-expansion-control process is performed, a group having "unused" group identifier is allocated to an inactive network IF to set so that the inactive network IF becomes a grouping target. Grouping setting is also performed with respect to the LAN L3 switch 2 in the same manner.

The grouping managing unit 150 first determines whether there is a traffic increase (step S101). Specifically, the grouping managing unit 150 refers to the network-IF-list storage unit 140 to determine whether at least one of the transmission-buffer waiting frequency and the reception-buffer depletion frequency is equal to or larger than the predetermined threshold. The determination is made before delay in a communication response time with the server 1 is detected by another server 4 or the terminals 5 and 6 on the network 3.

When it is determined that there is a traffic increase (step S101, Yes), the grouping managing unit 150 refers to the grouping-IF-list storage unit 130, to check if there is a network IF belonging to an "unused" group (step S102). For example, when the network IF 20 is inactive, the network IF 20 is detected as the network IF belonging to the "unused" group.

When there is the network IF belonging to the "unused" group (step S102, Yes), the grouping managing unit 150 instructs the grouping controller 160 and the hardware controller 170 to expand the band, and updates the grouping-IF-list storage unit 130 and the network-IF-list storage unit 140 (step S103). As the band expansion instruction, specifically, the grouping managing unit 150 notifies the hardware controller 170 to activate the inactive network IF, and notifies the grouping controller 160 to group the network IF, whose activation has been notified, and the other network IF having the traffic increase.

After performing step S103, the hardware controller 170 activates the inactive network IF (step S104). The grouping controller 160 then groups the two network IFs (step S105). Accordingly, the two network IFs can be shared to expand the band.

On the other hand, when there is no network IF belonging to the "unused" group (step S102, No), because all the network IFs already belong to other groups, the band cannot be expanded any more. Therefore, the process finishes.

Thus, when it is determined that there is a traffic increase in the network IF, the hardware controller 170 activates a network IF, and the grouping controller 160 groups the activated network IF and the network IF being used. Accordingly, a traffic detection process, an activation process of the network IF, and a grouping process of the network IF can be automatically performed collectively only by the server 1, thereby enabling to automatically expand the band.

Figure 6:
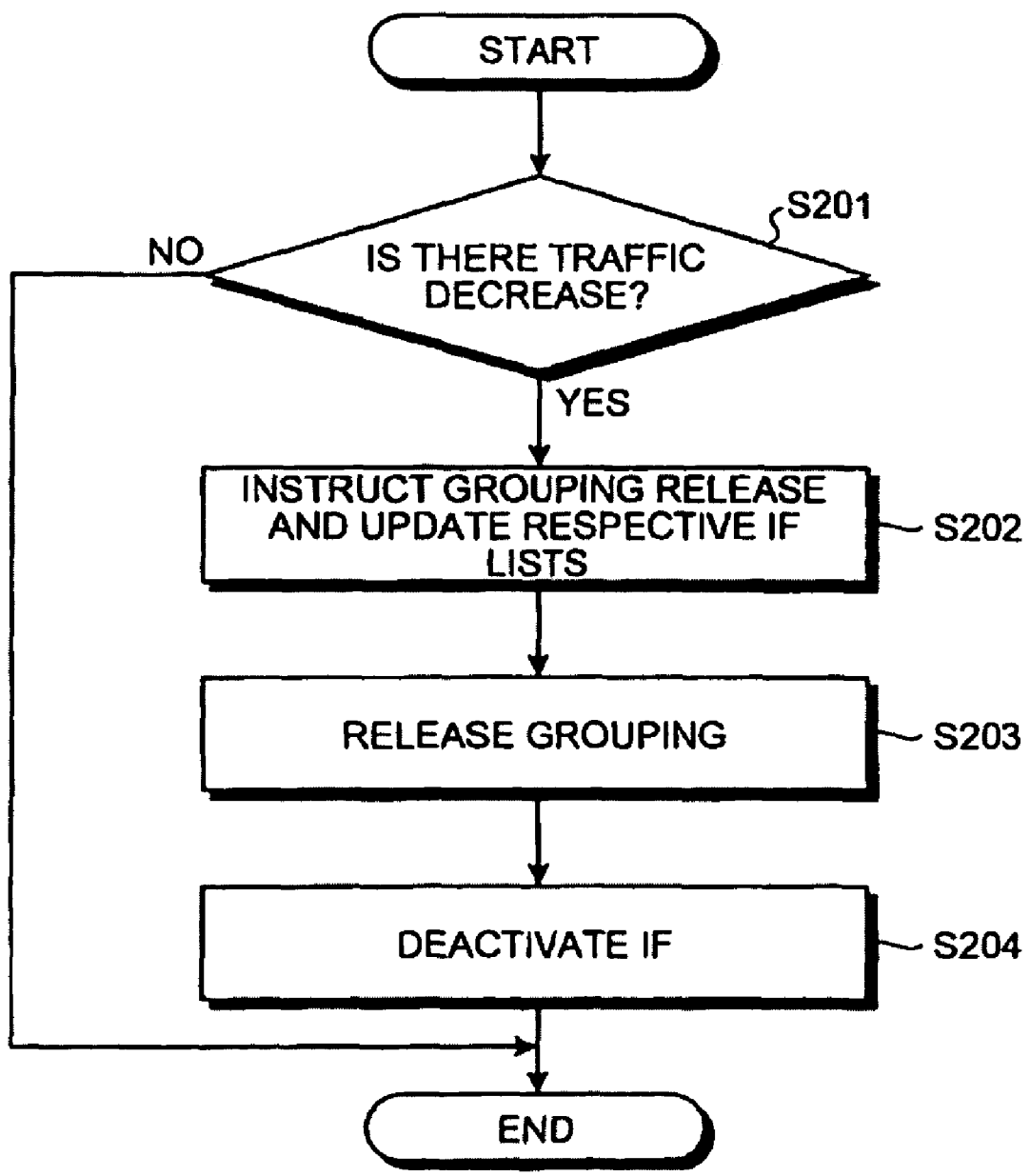
FIG. 6 is a flowchart of a process procedure of an automatic band-reduction-control process according to the first embodiment.

A process procedure of an automatic band-reduction-control process according to the first embodiment is explained next. FIG. 6 is a flowchart of the process procedure of the automatic band-reduction-control process according to the first embodiment. The automatic band-reduction-control process is regularly performed with a lapse of a certain time when two network IFs 10 and 20 are grouped.

The transmission data controller 110 determines whether there is a traffic decrease (step S201). As the detection process, when the number of transmission packets in a certain network IF (for example, network IF 20) is 0 for a predetermined period of time, the transmission data controller 110 determines that the traffic in the network IF has decreased.

When the traffic decrease is determined (step S201, Yes), the grouping managing unit 150 instructs the grouping controller 160 and the hardware controller 170 to reduce the band, and updates the grouping-IF-list storage unit 130 and the network-IF-list storage unit 140 (step S202). As the band reduction instruction, specifically, the grouping managing unit 150 notifies the grouping controller 160 to release the grouping of the network IF having the detected traffic decrease, and notifies the hardware controller 170 to deactivate the network IF.

After performing step S202, the grouping controller 160 releases the grouping of the network IF 20 (step S203). As a process for releasing the grouping, the grouping controller 160 changes the grouping identifier in the grouping-IF-list storage unit 130 and the network-IF-list storage unit 140 to "unused". The hardware controller 170 deactivates the network IF 20 (step S204). Accordingly, while sustaining communication by the network IF 10 on one side, the network IF 20 on the other side is deactivated, thereby enabling to reduce the band.

Thus, when the traffic decrease in the network IF is determined, the grouping controller 160 releases the grouping of the network IF, and the hardware controller 170 deactivates the network IF, thereby enabling to reduce a memory resource and an operating power relating to the unused network IF. This process can be also automatically performed collectively, without requiring any manual operation, as in the automatic band-expansion-control process in FIG. 5.

In the LAN-interface control program 100 according to the first embodiment, when a traffic increase in the network IF is detected by the grouping managing unit 150, the grouping managing unit 150 instructs the grouping controller 160 and the hardware controller 170 to expand the band. The hardware controller 170 activates an inactive network IF and the grouping controller 160 groups the network IF, thereby enabling to automatically expand the band.

In the LAN-interface control program 100 according to the first embodiment, when a traffic decrease in the network IF is detected by the transmission data controller 110, the grouping managing unit 150 instructs the grouping controller 160 and the hardware controller 170 to reduce the band. The grouping controller 160 releases the grouping and the hardware controller 170 deactivates the network IF, thereby enabling to automatically reduce an unnecessary band and to reduce the memory resource and the operating power. Accordingly, an appropriate communication band can be provided by automatically executing the band expansion/reduction according to the communication situation.

In the second embodiment, band control according to the operation priority in the case of simultaneously performing a plurality of operations on the server is explained. FIGS. 7A to 7D are explanatory diagrams of an operation of the LAN-interface control program 100 according to the second embodiment. The LAN-interface control program 100 according to the second embodiment is different from that of the first embodiment in that setting relating to the operation priority is included in the grouping IF list. In the second embodiment, a case that the server 1 includes three network IFs is explained, however, the number of the network IF is not limited to three, and only required to be equal to or more than three.

Figure 7A:
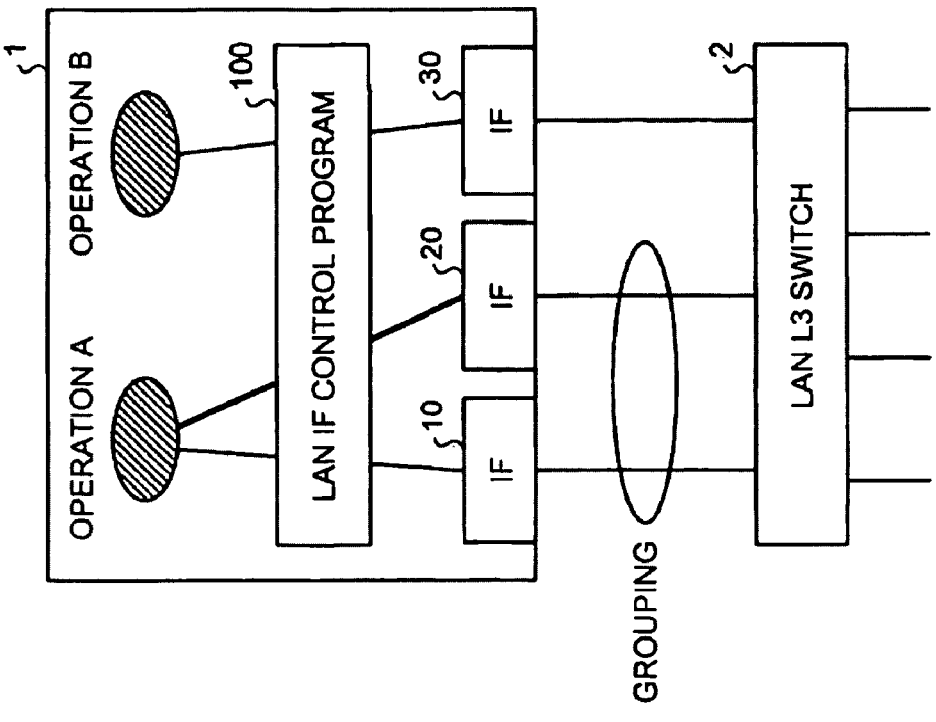
FIGS. 7A and 7D are explanatory diagrams of an operation of a LAN-interface control program according to a second embodiment.

As shown in FIG. 7A, transmission of data relating to two operations A and B performed by the server 1 is allocated to respective network IFs 10 to 30 by the LAN-interface control program 100 and executed. The respective network IFs 10 to 30 are connected to the network via the LAN L3 switch 2, and the transmission of data relating to the operations A and B is performed via these network IFs. In FIG. 7A, the network IF 10 is allocated to the operation A and the network IF 30 is allocated to the operation B, and the network IF 20 is in an inactive state.

The operation here represents an operation between server networks, and for example, when the server 1 is a Web server, the operation represents user access, when the server 1 is a mail server, the operation represents email distribution, and when the server 1 is a database server, the operation represents data request traffic.

The operation priority is preset for the respective operations A and B, and the setting of the operation priority is stored in the grouping-IF-list storage unit 130. The LAN-interface control program 100 performs grouping control of the network IFs 10 to 30 according to the operation priority.

FIG. 8A is one example of the grouping IF list according to the second embodiment. As shown in FIG. 8A, the group identifier, the IF identifier of the network IF constituting the group, and the priority of the group are associated with each other for each group in the group IF list. The operation and the group are in one-to-one correspondence. In FIG. 8A, a group having a group identifier of "Group1" corresponds to the operation A and the priority of this group is "1". A group having a group identifier of "Group2" corresponds to the operation B and the priority of the group is "2". Accordingly, in this case, the operation priority of the operation A is higher than that of the operation B.

An automatic band-expansion-control process in the server 1 according to the second embodiment is explained next with reference to FIGS. 7A and 7B. Because the process at this time is the same as the automatic band-expansion-control process in the first embodiment shown in FIG. 5, it is explained briefly.

Figure 7B:
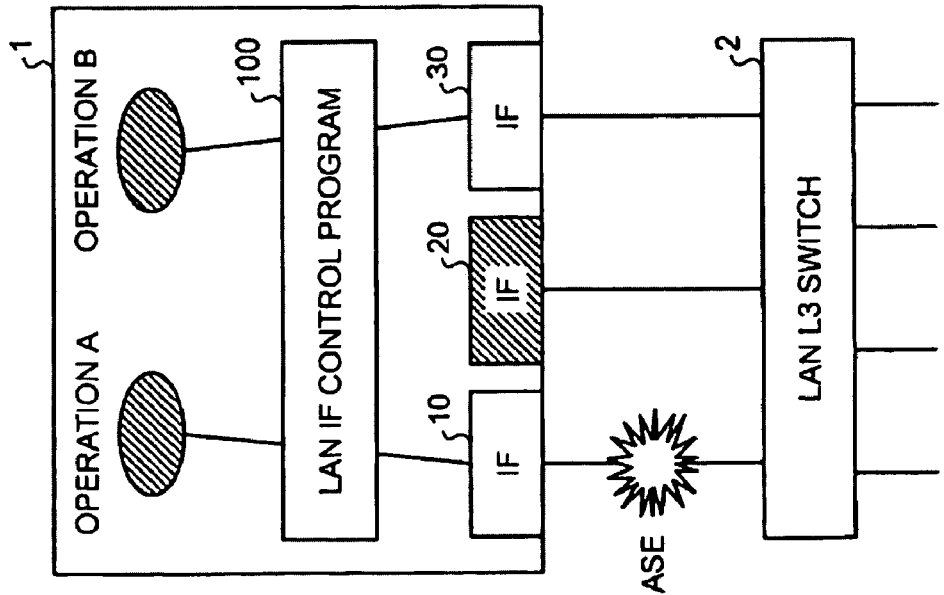

As shown in FIG. 7A, when it is detected by the LAN-interface control program 100 that the traffic in the network IF 10 corresponding to the operation A has increased, as shown in FIG. 7B, the inactive network IF 20 is activated and two network IFs 10 and 20 are grouped. At this time, the grouped two network IFs 10 and 20 are associated with the operation A. Accordingly, the band used by the operation A can be expanded.

FIG. BB depicts the grouping IF list at the time of finishing the process in FIG. 7B. As shown in FIG. 8B, the network IFs 10 and 20 are allocated to the group "Group1" corresponding to the operation A and the network IF 30 is allocated to the group "Group2" corresponding to the operation B.

Figure 7C:
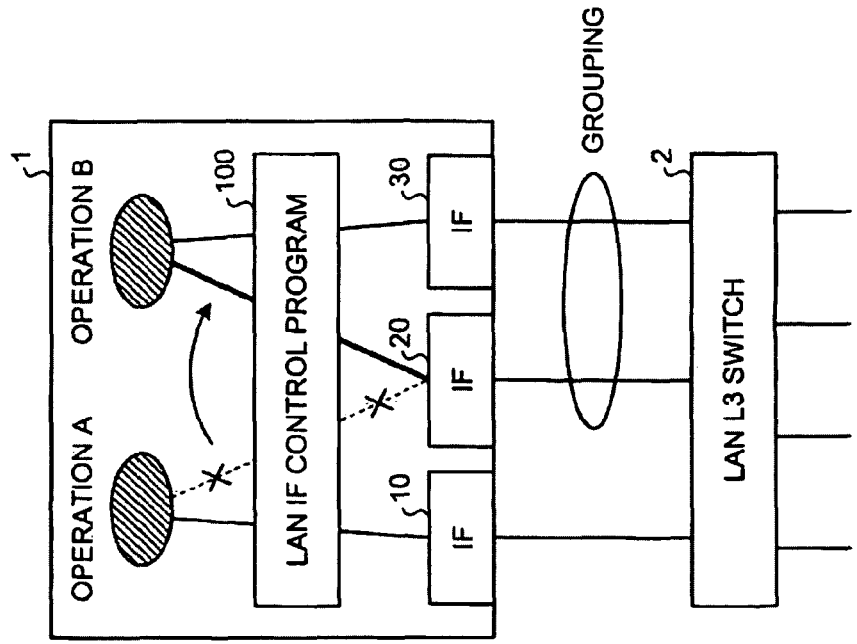

The band control according to the operation priority can be also performed. The band control according to the operation priority in the server 1 according to the second embodiment is explained next with reference to FIGS. 7C and 7D. After transition to a state shown in FIG. 7B, as shown in FIG. 7C, it is assumed that the traffic in the network IF 30 allocated to the operation B has increased.

When the operation priority of the operation B is higher than that of the operation A, even if band expansion with respect to the operation B is attempted, the remaining two network IFs 10 and 20 have been already allocated to another operation A, and the band cannot be expanded further.

In the second embodiment, therefore, the band control of the network IF according to the operation priority is enabled. That is, the network IF already used by the operation A having low operation priority can be made the grouping target in the automatic band-expansion-control process, with respect to the operation B having high operation priority.

Figure 7D:
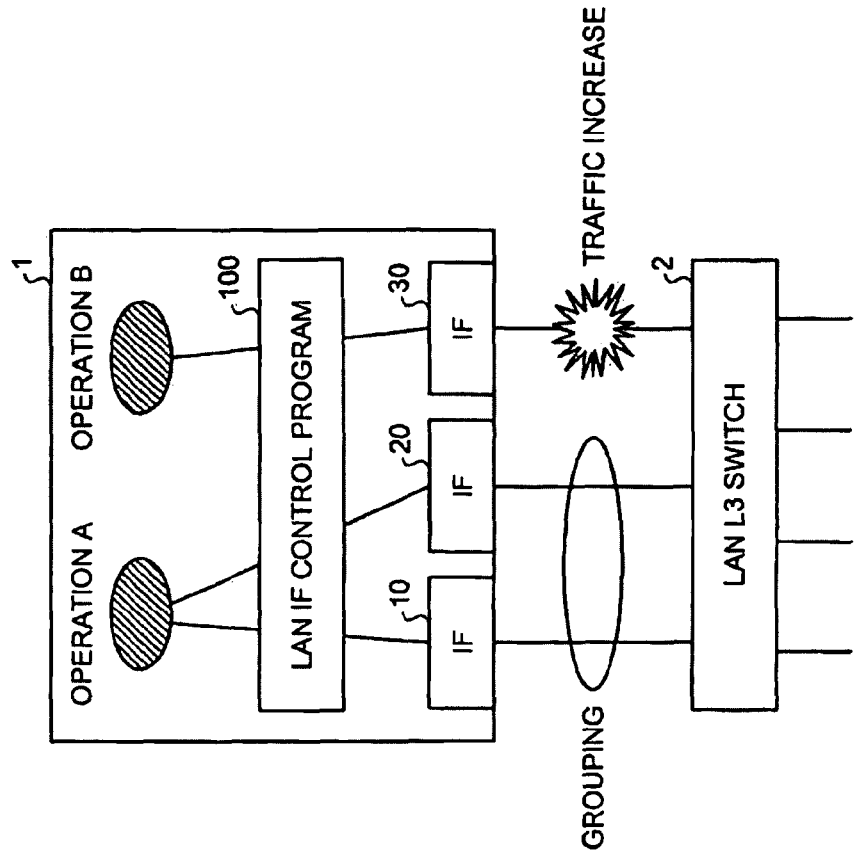

That is, as shown in FIG. 7D, the grouping of the network IF 20 already used by the operation A is released to deactivate the network IF 20 once, and then, the network IF 20 is activated again to perform grouping of the network IF 20 with the network IF 30.

FIG. 8C depicts the grouping IF list at the time of finishing the process in FIG. 7D. As shown in FIG. 8C, the group to which the network IF 20 belongs is changed from "Group1" to "Group2", and the network IF 20 is grouped with the network IF 30.

Thus, by performing the band control according to the operation priority, the band can be preferentially expanded with respect to the operation with a high operation priority, regardless of the usage of the network IF.

While the network IF 20 is allocated to the operation B, any method can be used as the determination method of the network IF. The network IF 10 can be allocated to the operation B instead of the network IF 20.

The network IF 20 is deactivated once and then activated again at the time of changing the operation using the network IF 2; however, grouping release and new grouping can be executed without performing the deactivation process. In this case, because setting before grouping release is left in the network IF 20, initialization is required before the new grouping.

Accordingly, the operation using the network IF 20 is changed from the operation A to the operation B, and the traffic of data transmission can be preferentially reduced with respect to the operation B having the high operation priority.

As described above, in the second embodiment, when a plurality of operations is executed simultaneously, the band control according to the operation priority of respective operations is performed, thereby enabling to expand the band preferentially with respect to the operation with the high operation priority, regardless of the usage of the network IF.

Figure 9:
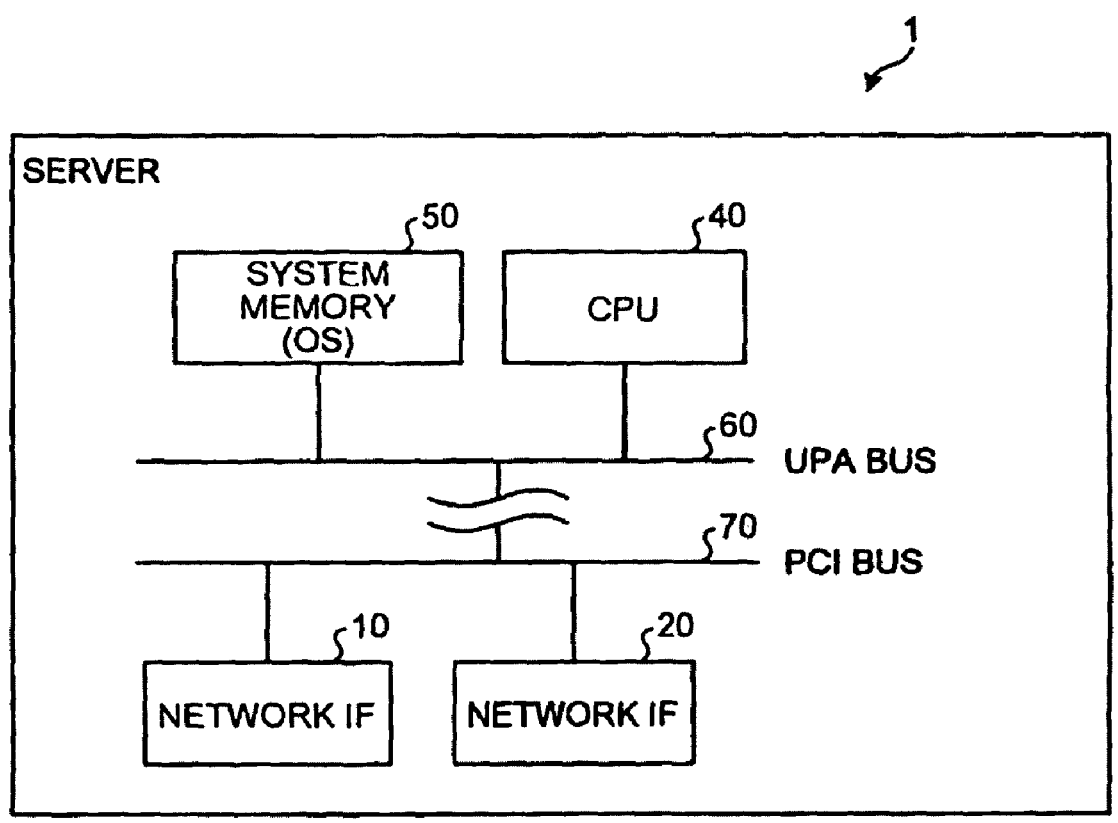
FIG. 9 depicts a hardware configuration of a server that executes the LAN-interface control program according to the first and second embodiments.

The hardware configuration of the server 1 that executes the LAN-interface control program 100 according to the first and second embodiments is explained next. FIG. 9 depicts the hardware configuration of the server that executes the LAN-interface control program 100 according to the first and second embodiments. The server 1 according to the embodiments includes a plurality of network IFs 10 and 20, a CPU (Central Processing Unit) 40, a system memory 50, a UPA (Ultra Port Architecture) bus 60, and a PCI (Peripheral Component Interconnect) bus 70.

The network IFs 10 and 20 are connected to the LAN L3 switch (not shown), to transmit and receive data to and from external devices through the LAN L3 switch via the network. The CPU 40 executes the LAN-interface control program 100 and the like. The system memory 50 is a readable and writable memory for storing the OS, the LAN-interface control program 100, and the like.

The UPA bus 60 functions as a system bus, and connects the CPU 40, the system memory 50, and a chip set (not shown). The PCI bus 70 is connected to the network IFs 10 and 20, for transmitting and receiving data to and from the CPU 40 and the system memory 50 via a bridge and the UPA bus 60.

According to the embodiments, the communication band can be automatically expanded when the traffic increases. Accordingly, there is an effect that an appropriate communication band can be provided.

According to the embodiments, because an inactive network interface can be made as a grouping target, there is an effect that the network interface can be effectively used.

According to the embodiments, because a traffic increase can be automatically detected, there is an effect that the communication band can be automatically controlled.

According to the embodiments, the communication band can be automatically reduced when the traffic decreases. Accordingly, there is an effect that an appropriate communication band can be provided.

According to the embodiments, because an unused network interface can be suspended, there is an effect that power saving can be enabled.

According to the embodiments, because a traffic decrease can be automatically detected, there is an effect that the communication band can be automatically controlled.

According to the embodiments, because the communication band can be preferentially expanded for the operation having high operation priority, there is an effect that the band can be controlled according to the operation priority.

According to the embodiments, because grouping can be performed by using a known technique, there is an effect that grouping can be easily performed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer readable medium encoded with a computer program for causing a computer including a plurality of network interfaces connected to a network repeater to execute:
   detecting a traffic increase in each network interface;
   expanding a communication band by grouping a network interface in which the traffic increase is detected and another unused network interface;
   detecting an inactive network interface; and
   activating the network interface detected, wherein
   the expanding the communication band includes grouping the network interface activated in the activating.

2. The computer readable medium according to claim 1, wherein the detecting the traffic increase includes, when at least one of a transmission waiting frequency for a given length of time and a reception depletion frequency for a given length of time is a predetermined threshold or higher in the network interface, determining that the traffic is increased.

3. The computer readable medium according to claim 1, further comprising:
   detecting a traffic decrease in the network interface;
   reducing the communication band by excluding the network interface in which the traffic decrease is detected, from a group including the network interface; and
   deactivating the network interface excluded from the group.

4. The computer readable medium according to claim 3, wherein the detecting the traffic decrease includes, when the number of transmission packets for a given length of time in the network interface (10, 20, 30) is a predetermined threshold or less, determining that the traffic is decreased.

5. The computer readable medium according to claim 1, wherein
   the computer simultaneously performs a plurality of operations each having an operation priority,
   wherein the program further comprises excluding a second network interface used for an operation with a lower operation priority than an operation using the first network interface from a group including the second network interface, when there is no unused network interface and a traffic increase is detected in a first network interface in the detecting the traffic increase,
   wherein the expanding the communication band includes grouping the first network interface in which the traffic increase is detected and the second network interface excluded from the group.

6. The computer readable medium according to claim 1, wherein the grouping is a process by link aggregation prescribed in IEEE 802.3ad.

7. A network interface controller comprising:
   a plurality of network interfaces connected to a network repeater;
   a traffic-increase detection unit that detects a traffic increase in each network interface;
   a band expansion unit that expands a communication band by grouping a network interface in which the traffic increase is detected by the traffic-increase detection unit and another unused network interface;
   an inactive-interface detection unit that detects an inactive network interface; and
   a hardware activation unit that activates the network interface detected by the inactive-interface detection unit, wherein
   the band expansion unit groups the network interface activated by the hardware activation unit.

8. The network interface controller according to claim 7, further comprising:
   a traffic-decrease detection unit that detects a traffic decrease in the network interface;
   a band reduction unit that reduces the communication band by excluding the network interface in which the traffic decrease is detected by the traffic-decrease detection unit, from a group including the network interface; and
   a hardware deactivation unit that deactivates the network interface excluded from the group by the band reduction unit.

* * * * *